United States Patent
Lee et al.

(10) Patent No.: US 10,868,898 B2
(45) Date of Patent: Dec. 15, 2020

(54) WIRELESS CHARGING DEVICE APPLYING ANTENNA MODULE

(71) Applicant: Cheng Uei Precision Industry Co., Ltd., New Taipei (TW)

(72) Inventors: James Cheng Lee, La Habra, CA (US); Kuo Yang Wu, New Taipei (TW); Wen Bing Hsu, New Taipei (TW); Jui Hui Lin, New Taipei (TW); Kuo Wei Chang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 142 days.

(21) Appl. No.: 16/249,930

(22) Filed: Jan. 17, 2019

(65) Prior Publication Data
US 2020/0036235 A1    Jan. 30, 2020

Related U.S. Application Data

(60) Provisional application No. 62/703,434, filed on Jul. 26, 2018.

(51) Int. Cl.
| | |
|---|---|
| *H02J 7/00* | (2006.01) |
| *H04M 1/02* | (2006.01) |
| *H04B 1/3827* | (2015.01) |
| *H02J 50/80* | (2016.01) |
| *H02J 7/02* | (2016.01) |

(52) U.S. Cl.
CPC ........... *H04M 1/0249* (2013.01); *H02J 7/025* (2013.01); *H02J 50/80* (2016.02); *H04B 1/3827* (2013.01); *H04M 1/026* (2013.01); *H04M 1/0202* (2013.01)

(58) Field of Classification Search
CPC .. H04M 1/0249; H04M 1/026; H04M 1/0202; H04M 1/185; H04M 1/72527; H02J 50/80; H02J 7/025; H04B 1/3827; H04B 1/3888; H01Q 1/245; H01Q 1/243
USPC .......................................... 320/108; 307/104
See application file for complete search history.

(56) References Cited

U.S. PATENT DOCUMENTS

2009/0121677 A1\* 5/2009 Inoue .................. H01M 10/425
320/108

\* cited by examiner

*Primary Examiner* — Zixuan Zhou
(74) *Attorney, Agent, or Firm* — Lin & Associates Intellectual Property, Inc.

(57) ABSTRACT

A wireless charging device adapted for being applied in and installed to a mobile communication device. The wireless charging device is matched with the mobile communication device. The wireless charging device includes a charging module for charging the mobile communication device, and an antenna module mounted to and fastened to a rear face of the charging module. The charging module covers a rear of the mobile communication device. The antenna module opens a plurality of narrow slots. The plurality of the narrow slots are of arc shapes.

19 Claims, 5 Drawing Sheets

WIRELESS CHARGING DEVICE APPLYING ANTENNA MODULE

BACKGROUND OF THE INVENTION

1. Field of the Invention

The present invention generally relates to a wireless charging device, and more particularly to a wireless charging device applying an antenna module and featured with a signal enhancement function.

2. The Related Art

Due to conveniences of mobile communication devices, such as smart phones in communication applications, the mobile communication devices have gradually become necessities in people's lives. The mobile communication devices proceed communicating through a Long Term Evolution (LTE) technology for using various functions.

In order to correspond to a large amount of power consumptions of the mobile communication device which is the smart phone, a manufacturer introduced a wireless charging device corresponding to the mobile communication device. The wireless charging device includes a battery. When a user uses the wireless charging device to charge the mobile communication device, the battery of the wireless charging device can provide extra power for the mobile communication device to increase usage time of the mobile communication device. A design of the wireless charging device also saves a need of the user carrying a portable power source.

However, when the wireless charging device is installed to the mobile communication device, intensities of LTE signals transmitted and received by the mobile communication device are lowered. As a result, a user has no way of using the mobile communication device together with the wireless charging device normally.

Therefore, it is necessary to provide an innovative wireless charging device applying an antenna module and featured with a signal enhancement function, when the wireless charging device is installed to the mobile communication device, intensities of LTE signals of the mobile communication device together with the innovative wireless charging device are able to be enhanced to make a user use the mobile communication device together with the innovative wireless charging device normally.

SUMMARY OF THE INVENTION

An object of the present invention is to provide a wireless charging device adapted for being applied in and installed to a mobile communication device. The wireless charging device is matched with the mobile communication device. The wireless charging device includes a charging module for charging the mobile communication device, and an antenna module mounted to and fastened to a rear face of the charging module. The charging module covers a rear of the mobile communication device. The antenna module opens a plurality of narrow slots. The plurality of the narrow slots are of arc shapes.

Another object of the present invention is to provide a wireless charging device adapted for being applied in and installed to a mobile communication device. The wireless charging device is matched with the mobile communication device. The wireless charging device includes a charging module for charging the mobile communication device, and an antenna module adhered to a rear face of the charging module. The charging module covers a rear of the mobile communication device. The antenna module opens a plurality of narrow slots arranged in two rows along a left-to-right direction. The plurality of the narrow slots are of arc shapes. The two rows of the plurality of the narrow slots are divided into a first row of the narrow slots and a second row of the narrow slots arranged along the left-to-right direction and seen from a front view of the antenna module. A quantity of the first row of the narrow slots is less than a quantity of the second row of the narrow slots.

Another object of the present invention is to provide an antenna module applied in a wireless charging device which includes a charging module. The antenna module includes a base slice fastened to a rear face of the charging module, and a plurality of narrow slots opened in the base slice. The plurality of the narrow slots are arranged in two rows along a left-to-right direction. Each row of the narrow slots are arranged along an up-down direction. Arc lengths of the narrow slots of each row gradually become smaller along the up-down direction.

As described above, when the wireless charging device is installed to the mobile communication device, the antenna module is mounted to and fastened to the rear face of the charging module to increase an area of transmitting and receiving signals of the mobile communication device together with the wireless charging device, intensities of LTE signals of the mobile communication device are enhanced by virtue of metal material characteristics of the antenna module and an arrangement of the plurality of the narrow slots of the wireless charging device to improve communication quality of the mobile communication device for ensuring that a user use the mobile communication device normally. Furthermore, a size of the antenna module is appropriate for a size of the rear face of the charging module to effectively control a volume of the wireless charging device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
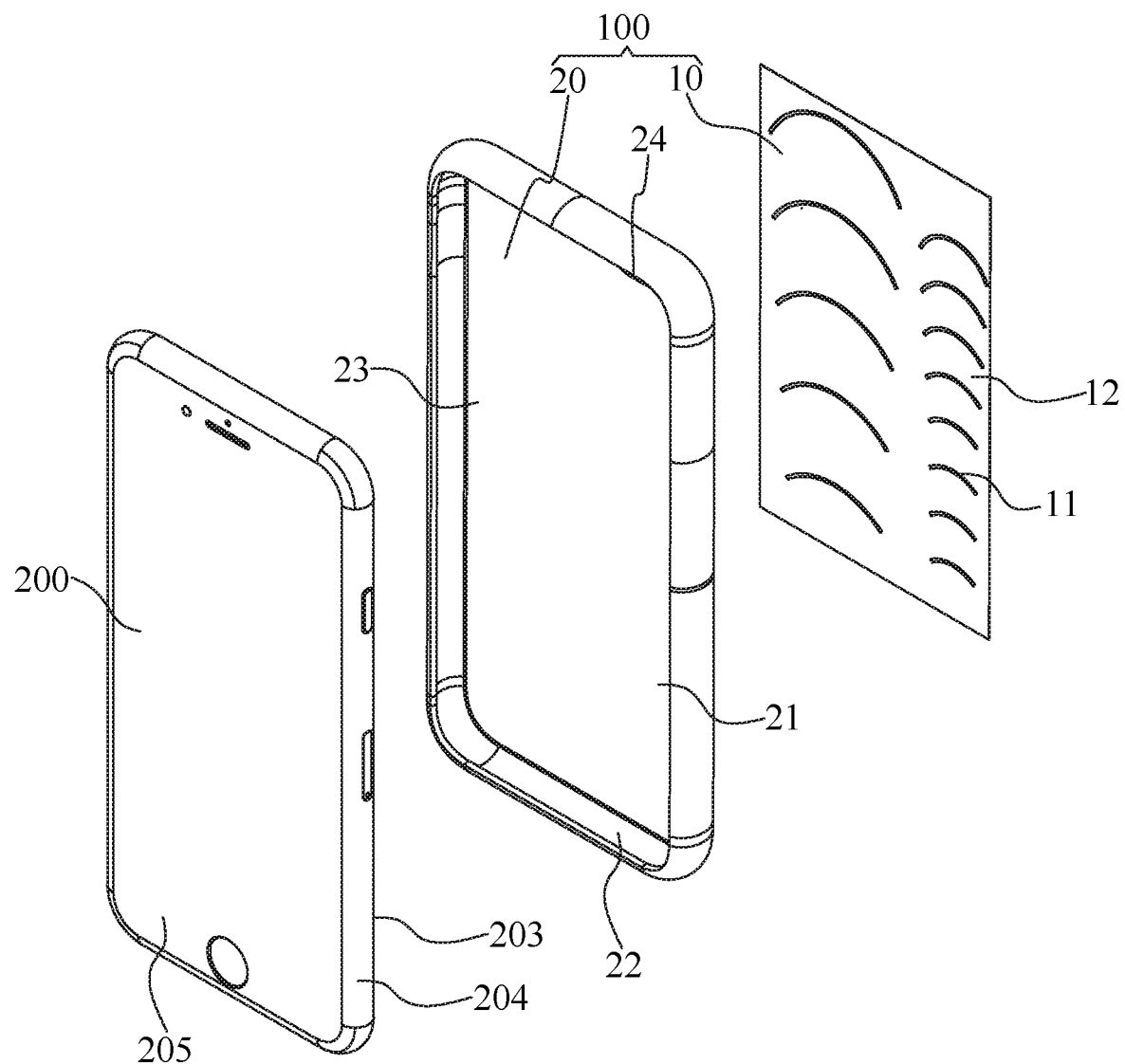
FIG. 1 is an exploded perspective view showing a mobile communication device and a wireless charging device in accordance with a preferred embodiment of the present invention.
Figure 2:
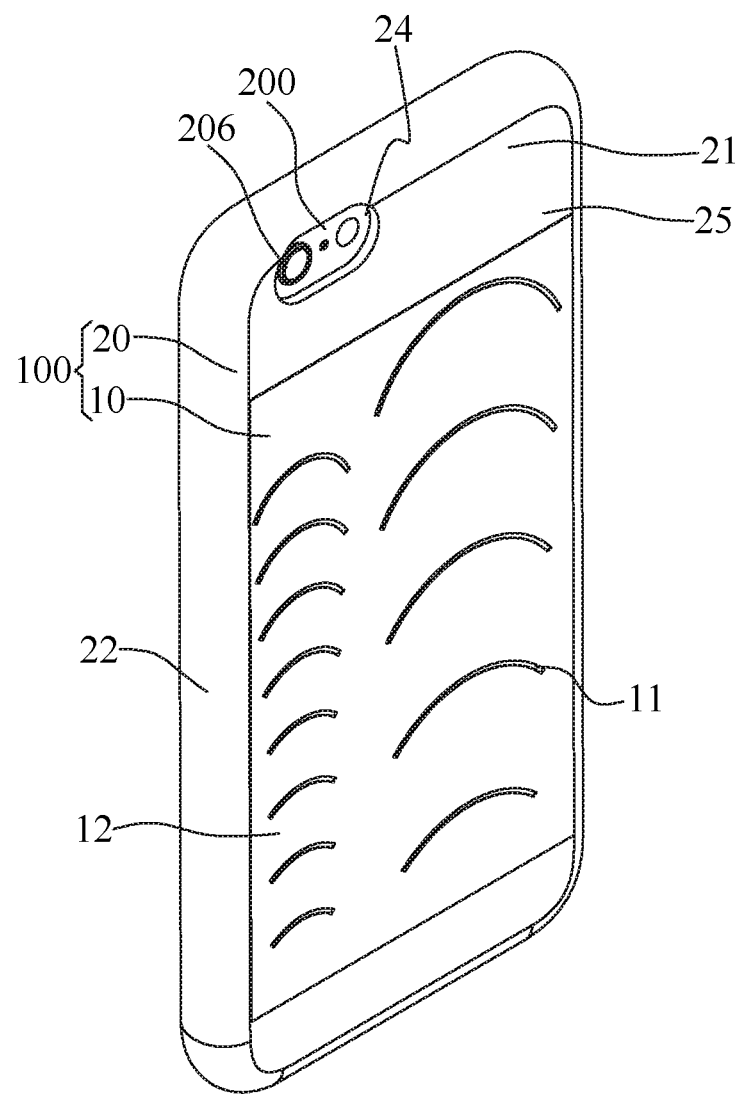
FIG. 2 is a perspective view of the mobile communication device and the wireless charging device in accordance with the preferred embodiment of the present invention, wherein the wireless charging device is installed to the mobile communication device.
Figure 3:
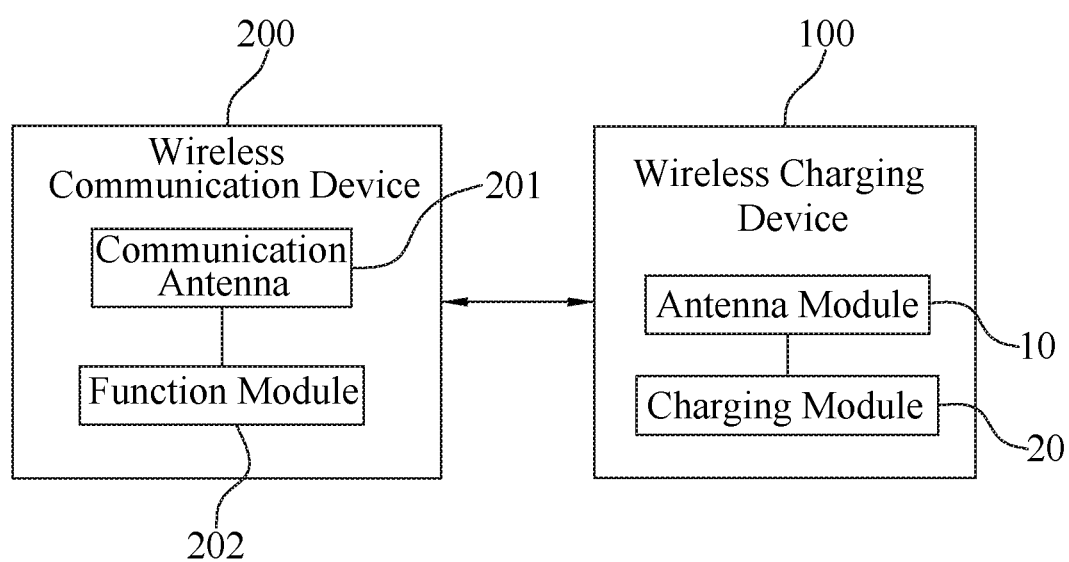
FIG. 3 is a block diagram showing the wireless charging device and the mobile communication device of FIG. 1.
Figure 4:
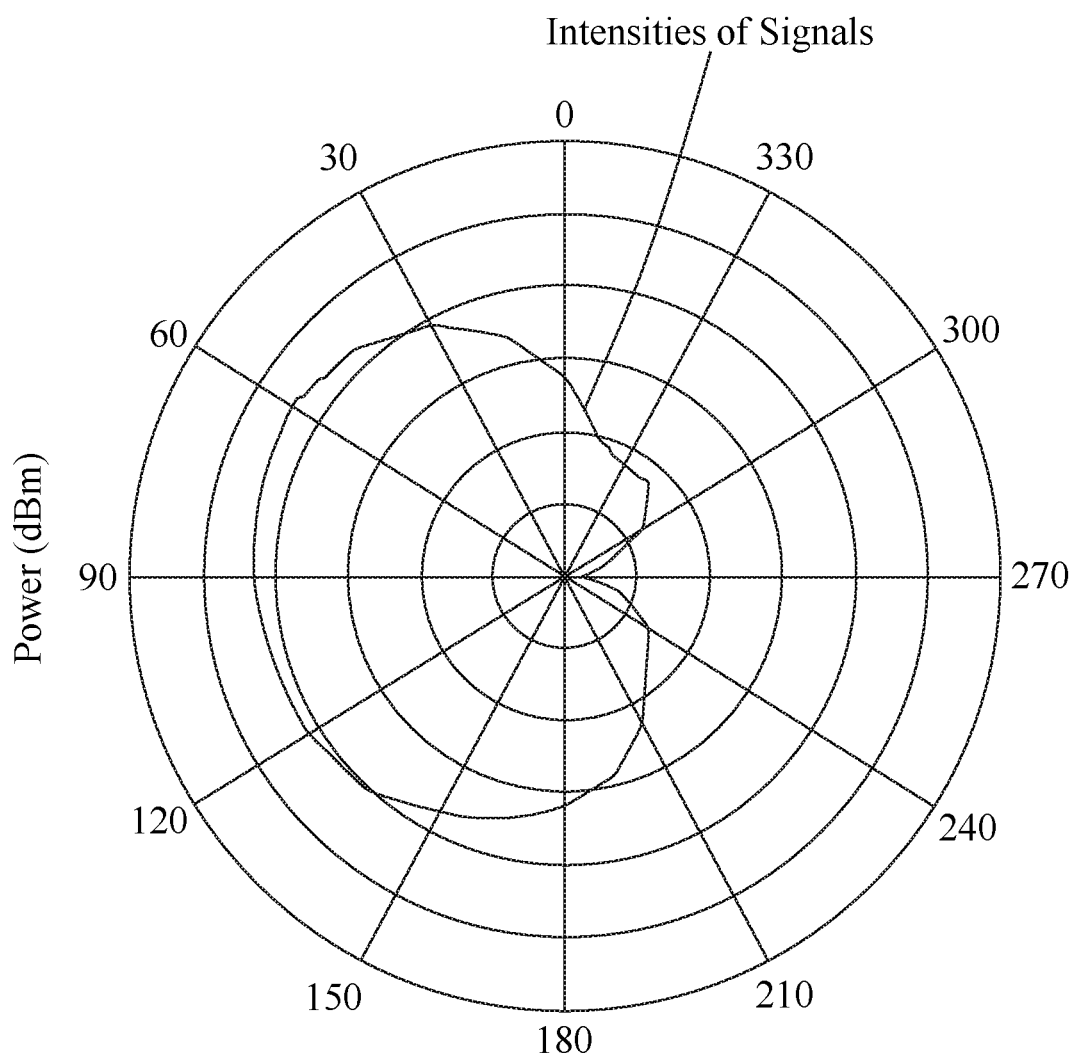
FIG. 4 shows a radiation pattern of LTE signals of the mobile communication device, wherein a charging module of the wireless charging device is installed to the mobile communication device, and an antenna module of the wireless charging device is without being mounted to the charging module of the mobile communication device of FIG. 1.

With reference to FIG. 1 to FIG. 3, a wireless charging device 100 in accordance with a preferred embodiment of the present invention is shown. The wireless charging device 100 is adapted for being applied in and installed to a mobile communication device 200. The wireless charging device 100 is matched with the mobile communication device 200. In the preferred embodiment, the mobile communication device 200 is a smart phone. The wireless charging device 100 is mounted to a rear of the mobile communication device 200 which is the smart phone. Specifically, the wireless charging device 100 includes an antenna module 10, and a charging module 20 for charging the mobile communication device 200. The mobile communication device 200 includes a communication antenna 201, and a function module 202 connected with the communication antenna 201.

The mobile communication device 200 realizes a communication function by virtue of the communication antenna 201. The antenna module 10 of the wireless charging device 100 is coupled with the communication antenna 201 of the mobile communication device 200 to transmit and receive signals, so that intensities of the signals of the mobile communication device 200 are able to be enhanced to improve communication quality of the mobile communication device 200. The signals of the mobile communication device 200 include LTE (Long Term Evolution) signals.

With reference to FIG. 1 to FIG. 3 again, the charging module 20 is of a back cover shape. The charging module 20 covers the rear of the mobile communication device 200. The charging module 20 has a rectangular base board 21, a peripheral wall 22 protruded frontward from a periphery of the base board 21, and a receiving space 23 formed between the base board 21 and the peripheral wall 22. A top of the base board 21 opens a camera hole 24 for exposing a camera 206 of the mobile communication device 200. The mobile communication device 200 has a rear surface 203, a front surface 205 located in front of the rear surface 203, and a connecting portion 204 connected between the rear surface 203 and the front surface 205. The communication antenna 201 and the function module 202 are disposed among the rear surface 203, the front surface 205 and the connecting portion 204. The mobile communication device 200 is received in the receiving space 23 of the charging module 20. The base board 21 covers the rear surface 203 of the mobile communication device 200. The peripheral wall 22 of the charging module 20 surrounds the connecting portion 204 of the mobile communication device 200. The front surface 205 of the mobile communication device 200 is exposed out of the charging module 20. The communication antenna 201 is disposed inside the mobile communication device 200 and is close to the rear surface 203 of the mobile communication device 200.

With reference to FIG. 1 and FIG. 2, the antenna module 10 is a metal sheet. Specifically, the metal sheet is a copper sheet. The antenna module 10 is mounted to and fastened to a rear face 25 of the charging module 20. The antenna module 10 is adhered to the rear face 25 of the charging module 20. A size of the antenna module 10 is appropriate for a size of the rear face 25 of the charging module 20. The antenna module 10 is applied in and is designed as a part of the wireless charging device 100. The antenna module 10 opens a plurality of narrow slots 11. The antenna module 10 includes a base slice 12, and the plurality of the narrow slots 11 opened in the base slice 12. The antenna module 10 has the base slice 12 disposed vertically and fastened to the rear face 25 of the charging module 20. The base slice 12 is the metal sheet. The base slice 12 of the antenna module 10 opens the plurality of the narrow slots 11. The plurality of the narrow slots 11 are of arc shapes. Each of the plurality of the narrow slots 11 is arched upward.

In this preferred embodiment, the plurality of the narrow slots 11 are arranged in two rows along a left-to-right direction and seen from a front view of the antenna module 10. Each row of the narrow slots 11 are arranged along an up-down direction. A distance between two ends of each of the narrow slots 11 of one of the two rows is larger than a distance between two ends of each of the narrow slots 11 of the other row, and an arc length of each of the narrow slots 11 of the one of the two rows is larger than an arc length of each of the narrow slots 11 of the other row. The arc lengths of the narrow slots 11 of each row gradually become smaller along the up-down direction. One of each two nearest narrow slots 11 of each row is smaller than the other narrow slot 11 located over the one of each two nearest narrow slots 11 of each row. An arc length of an uppermost narrow slot 11 of the one of the two rows is larger than an arc length of a lowest narrow slot 11 of the one of the two rows. An arc length of an uppermost narrow slot 11 of the other row is larger than an arc length of a lowest narrow slot 11 of the other row.

The two rows of the plurality of the narrow slots 11 are divided into a first row of the narrow slots 11 and a second row of the narrow slots 11 arranged along the left-to-right direction and seen from the front view of the antenna module 10. A quantity of the first row of the narrow slots 11 is less than a quantity of the second row of the narrow slots 11. The first row of the narrow slots 11 include five narrow slots 11 arranged along the up-down direction and seen from the front view of the antenna module 10. The second row of the narrow slots 11 include eight narrow slots 11 arranged along the up-down direction and seen from the front view of the antenna module 10. The second row of the narrow slots 11 are disposed on the right of the first row of the narrow slots 11 seen from the front view of the antenna module 10. Each narrow slot 11 of the first row is larger than each narrow slot 11 of the second row in size. A distance between two ends of each narrow slot 11 of the first row is larger than a distance between two ends of each narrow slot 11 of the second row, and an arc length of each narrow slot 11 of the first row is larger than an arc length of each narrow slot 11 of the second row. An up-down distance between each two nearest narrow slots 11 of the first row is larger than an up-down distance between each two nearest narrow slots 11 of the second row.

Figure 5:
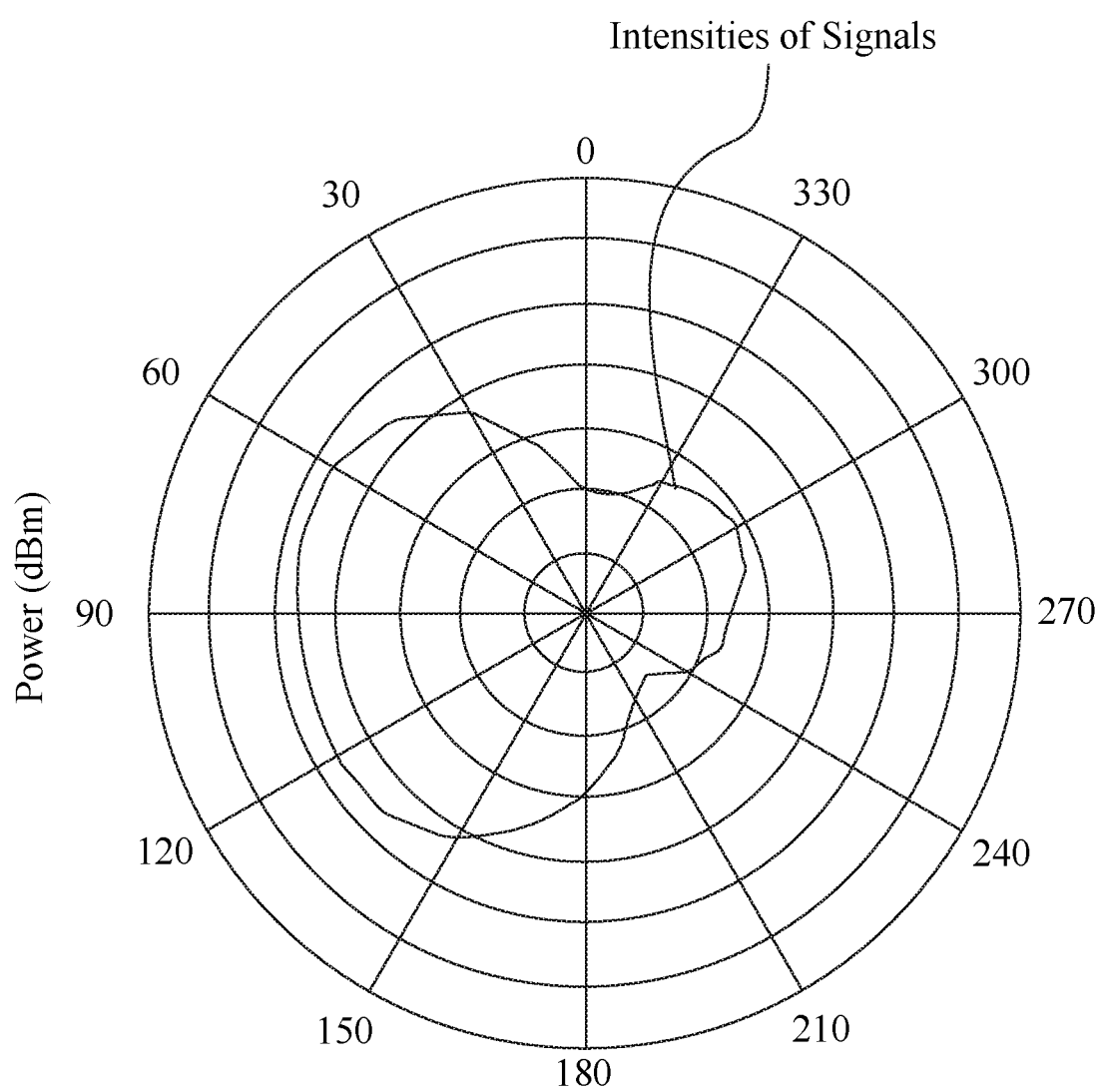
FIG. 5 shows another radiation pattern of the LTE signals of the mobile communication device, wherein the charging module and the antenna module of wireless charging device are installed to the mobile communication device of FIG. 1.

With reference to FIG. 1 to FIG. 5, FIG. 4 shows a radiation pattern of the LTE (Long Term Evolution) signals of the mobile communication device 200 to which the charging module 20 of the wireless charging device 100 is installed, and the antenna module 10 of the wireless charging device 100 is without being mounted to the charging module 20 of the mobile communication device 200. FIG. 5 shows another radiation pattern of the LTE signals of the mobile communication device 200 to which the charging module 20 and the antenna module 10 of the wireless charging device 100 are installed. It can be seen that intensities of the LTE signals of the mobile communication device 200 are enhanced on the whole after the charging module 20 and the antenna module 10 of the wireless charging device 100 are installed to the mobile communication device 200. So the wireless charging device 100 is featured with a signal enhancement function to enhance the intensities of the LTE signals of the mobile communication device 200 together with the wireless charging device 100.

As described above, when the wireless charging device 100 is installed to the mobile communication device 200, the antenna module 10 is mounted to and fastened to the rear face 25 of the charging module 20 to increase an area of transmitting and receiving the signals of the mobile communication device 200 together with the wireless charging device 100, the intensities of the LTE signals of the mobile communication device 200 are enhanced by virtue of metal material characteristics of the antenna module 10 and an arrangement of the plurality of the narrow slots 11 of the wireless charging device 100 to improve communication quality of the mobile communication device 200 for ensuring that a user use the mobile communication device 200 normally. Furthermore, the size of the antenna module 10 is appropriate for the size of the rear face 25 of the charging module 20 to effectively control a volume of the wireless charging device 100.

What is claimed is:

1. A wireless charging device adapted for being applied in and installed to a mobile communication device, the wireless charging device being matched with the mobile communication device, the wireless charging device comprising:
    a charging module for charging the mobile communication device, the charging module covering a rear of the mobile communication device; and
    an antenna module mounted to and fastened to a rear face of the charging module, the antenna module opening a plurality of narrow slots, the plurality of the narrow slots being of arc shapes;
    wherein the charging module has a rectangular base board, a peripheral wall protruded frontward from a periphery of the rectangular base board, and a receiving space formed between the rectangular base board and the peripheral wall, the mobile communication device is received in the receiving space, the rectangular base board covers a rear surface of the mobile communication device, the peripheral wall surrounds the mobile communication device, and a front surface of the mobile communication device is exposed out of the charging module.

2. The wireless charging device as claimed in claim 1, wherein the plurality of the narrow slots are arranged in two rows along a left-to-right direction and seen from a front view of the antenna module, the two rows of the plurality of the narrow slots are divided into a first row of the narrow slots and a second row of the narrow slots arranged along the left-to-right direction and seen from the front view of the antenna module.

3. The wireless charging device as claimed in claim 2, wherein the first row of the narrow slots include five narrow slots arranged along an up-down direction and seen from the front view of the antenna module, the second row of the narrow slots include eight narrow slots arranged along the up-down direction and seen from the front view of the antenna module, the second row of the narrow slots are disposed on the right of the first row of the narrow slots seen from the front view of the antenna module.

4. The wireless charging device as claimed in claim 2, wherein a distance between two ends of each narrow slot of the first row is larger than a distance between two ends of each narrow slot of the second row, and an arc length of each narrow slot of the first row is larger than an arc length of each narrow slot of the second row.

5. The wireless charging device as claimed in claim 2, wherein arc lengths of the narrow slots of each row gradually become smaller along an up-down direction.

6. The wireless charging device as claimed in claim 2, wherein one of each two nearest narrow slots of each row is smaller than the other narrow slot located over the one of each two nearest narrow slots of each row.

7. The wireless charging device as claimed in claim 2, wherein an up-down distance between each two nearest narrow slots of the first row is larger than an up-down distance between each two nearest narrow slots of the second row.

8. The wireless charging device as claimed in claim 1, wherein the antenna module is a metal sheet.

9. The wireless charging device as claimed in claim 8, wherein the metal sheet is a copper sheet.

10. The wireless charging device as claimed in claim 1, wherein the charging module is of a back cover shape.

11. The wireless charging device as claimed in claim 1, wherein the antenna module is adhered to the rear face of the charging module.

12. The wireless charging device as claimed in claim 1, wherein a size of the antenna module is appropriate for a size of the rear face of the charging module.

13. The wireless charging device as claimed in claim 1, wherein the antenna module has a base slice disposed vertically and fastened to the rear face of the charging module, the base slice opens the plurality of the narrow slots, each of the plurality of the narrow slots is arched upward.

14. A wireless charging device adapted for being applied in and installed to a mobile communication device, the wireless charging device being matched with the mobile communication device, the wireless charging device comprising:
    a charging module for charging the mobile communication device, the charging module covering a rear of the mobile communication device; and
    an antenna module adhered to a rear face of the charging module, the antenna module opening a plurality of narrow slots arranged in two rows along a left-to-right direction, the plurality of the narrow slots being of arc shapes, the two rows of the plurality of the narrow slots being divided into a first row of the narrow slots and a second row of the narrow slots arranged along the left-to-right direction and seen from a front view of the antenna module, a quantity of the first row of the narrow slots being less than a quantity of the second row of the narrow slots;
    wherein the charging module has a rectangular base board, a peripheral wall protruded frontward from a periphery of the rectangular base board, and a receiving space formed between the rectangular base board and the peripheral wall, the mobile communication device is received in the receiving space, the rectangular base board covers a rear surface of the mobile communication device, the peripheral wall surrounds the mobile communication device, and a front surface of the mobile communication device is exposed out of the charging module.

15. The wireless charging device as claimed in claim 14, wherein the first row of the narrow slots include five narrow slots arranged along an up-down direction and seen from the front view of the antenna module, the second row of the narrow slots include eight narrow slots arranged along the up-down direction and seen from the front view of the antenna module, the second row of the narrow slots are disposed on the right of the first row of the narrow slots seen from the front view of the antenna module.

16. An antenna module applied in a wireless charging device which includes a charging module, comprising:
   a base slice fastened to a rear face of the charging module; and
   a plurality of narrow slots opened in the base slice, the plurality of the narrow slots being arranged in two rows along a left-to-right direction, each row of the narrow slots being arranged along an up-down direction, arc lengths of the narrow slots of each row gradually becoming smaller along the up-down direction;
   wherein the charging module has a rectangular base board, a peripheral wall protruded frontward from a periphery of the rectangular base board, and a receiving space formed between the rectangular base board and the peripheral wall, a mobile communication device is received in the receiving space, the rectangular base board covers a rear surface of the mobile communication device, the peripheral wall surrounds the mobile communication device, and a front surface of the mobile communication device is exposed out of the charging module.

17. The antenna module as claimed in claim 16, wherein one of each two nearest narrow slots of each row is smaller than the other narrow slot located over the one of each two nearest narrow slots of each row.

18. The antenna module as claimed in claim 17, wherein the two rows of the plurality of the narrow slots are divided into a first row of the narrow slots and a second row of the narrow slots arranged along the left-to-right direction and seen from a front view of the antenna module, a distance between two ends of each narrow slot of the first row is larger than a distance between two ends of each narrow slot of the second row, and an arc length of each narrow slot of the first row is larger than an arc length of each narrow slot of the second row.

19. The antenna module as claimed in claim 16, wherein the two rows of the plurality of the narrow slots are divided into a first row of the narrow slots and a second row of the narrow slots arranged along the left-to-right direction and seen from a front view of the antenna module, an up-down distance between each two nearest narrow slots of the first row is larger than an up-down distance between each two nearest narrow slots of the second row.

* * * * *